A. D. TRENOR.
HELM LIMITING DEVICE.
APPLICATION FILED MAR. 14, 1918. RENEWED APR. 15, 1921.

1,405,078.

Patented Jan. 31, 1922.
2 SHEETS—SHEET 1.

WITNESS:
Chas. F. Clagett

INVENTOR
Albert D. Trenor
BY
A. J. Gardner
HIS ATTORNEY

A. D. TRENOR.
HELM LIMITING DEVICE.
APPLICATION FILED MAR. 14, 1918. RENEWED APR. 15, 1921.

1,405,078.

Patented Jan. 31, 1922.

2 SHEETS—SHEET 2.

WITNESS
Chas. F. Clagett

INVENTOR
Albert D. Trenor.
BY
A. S. Gardner,
HIS ATTORNEY

UNITED STATES PATENT OFFICE.

ALBERT D. TRENOR, OF NEW YORK, N. Y., ASSIGNOR TO JOHN HAYS HAMMOND, JR., OF GLOUCESTER, MASSACHUSETTS.

HELM-LIMITING DEVICE.

1,405,078.  Specification of Letters Patent.  Patented Jan. 31, 1922.

Application filed March 14, 1918, Serial No. 222,359. Renewed April 15, 1921. Serial No. 461,676.

*To all whom it may concern:*

Be it known that I, ALBERT D. TRENOR, a citizen of the United States, and a resident of New York, county of New York, and State of New York, have invented certain new and useful Improvements in Helm-Limiting Devices, of which the following is a specification.

Some of the objects of the present invention are to provide a means for maintaining a moving body upon a certain predetermined course whereby any variation or deviation of said body from the prescribed course is automatically and promptly corrected; to provide a steering mechanism adapted to move about a fixed axis through an angle proportioned in a definite ratio to any angle of deviation of the moving body from a predetermined course; to provide means to automatically arrest the movement of the steering mechanism after a certain angle of movement caused by the deviation of the moving body from its course; to provide means to vary the ratio of movement of the steering mechanism to the deviation of the moving body according to requirements.

Figure 1:
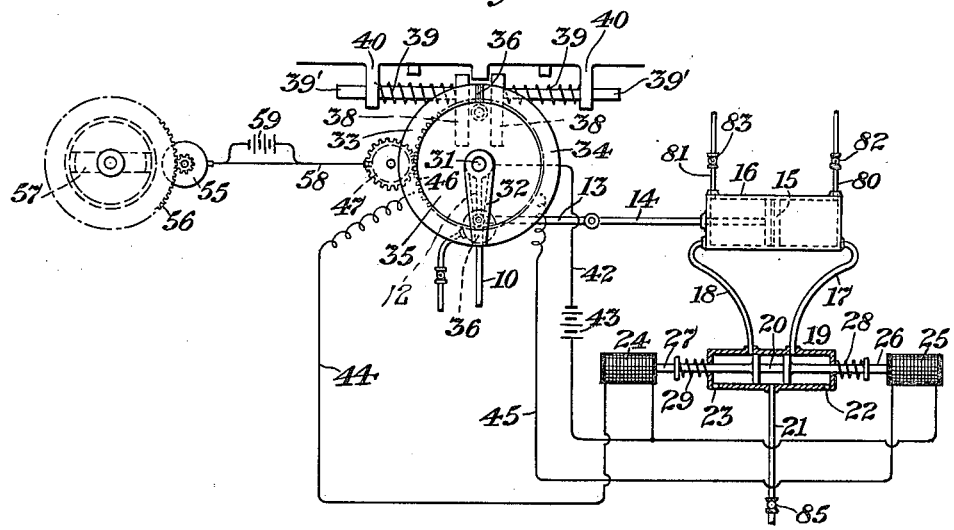
Figure 2:
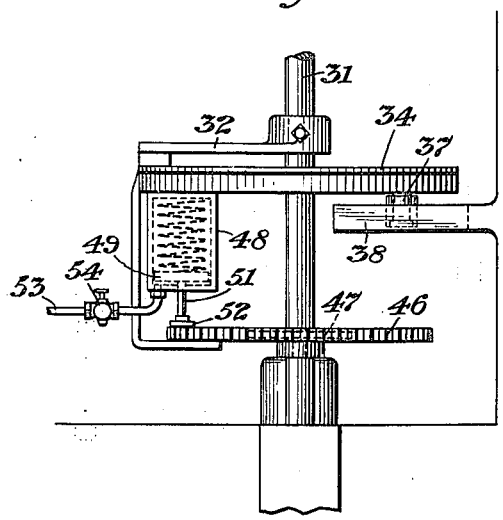
Figure 3:
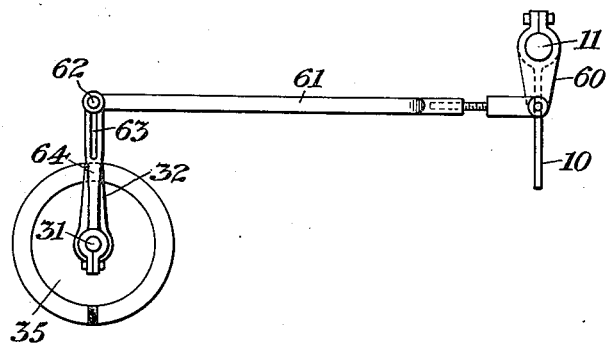
Figure 4:
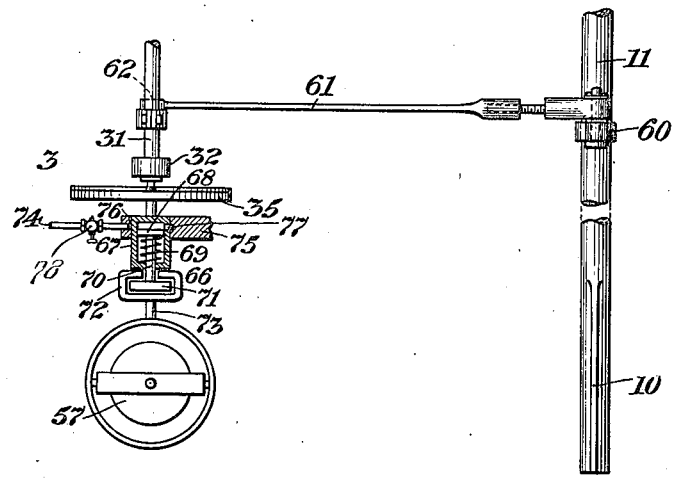

In the accompanying drawings Fig. 1 is a diagrammatic representation of a helm limiting device embodying the present invention; Fig. 2 is a detail in elevation of the control mechanism; Fig. 3 is a modification in plan of the motion transmitting means from the steering mechanism; and Fig. 4 is a side elevation of the parts shown in Fig. 3.

Referring to the drawings, one form of the invention comprises a rudder 10 which is rigidly secured to a rudder post 11 which when in operation is carried by a movable body and arranged to be rotated with respect thereto about an axis coincident with the longitudinal axis of the post and fixed with respect to the movable body to oscillate the rudder 10 to control the movement of the movable body. The rudder 10 and rudder post 11 may be usual rudder and rudder post of a torpedo, a boat or other marine vessel 11ª, or might form parts of an aircraft or other movable body.

Rigidly secured to the rudder post 11 is a lever arm 12 which is pivotally connected by means of a link 13 to one end of a piston rod 14, the other end of which is secured to a piston 15 which is arranged to be reciprocated in a fixed cylinder 16 under the action of compressed air or the like admitted alternately to or exhausted from opposite ends of the cylinder 16 through corresponding pipes 17 and 18 which are controlled by means of a cylindrical slide valve 19. This valve is of well known construction and includes a movable double valve element 20 which opens and closes communication between a main pressure fluid supply pipe 21 and the pipes 17 and 18 and between these latter and corresponding exhaust ports 22 and 23. The movable valve element 20 is operated and the direction of its movement selectively controlled by solenoids 24 and 25 having cores 26 and 27 respectively forming extensions of the movable valve element 20. Suitable springs 28 and 29 serve to return and maintain the valve 20 in neutral position when the solenoids are de-energized.

The mechanism by which the solenoids are selectively energized to control the rudder 10 according to requirements consists, in one embodiment of the invention, of a shaft 31 which in the form here described forms an extension of the rudder shaft 11, though this is not always the case. This shaft 31 carries a contact arm 32 fixed to move with said shaft and to slidably engage alternately two arcuate contact segments 33 and 34 mounted upon and rotatable with, but insulated from, a plate 35 which is loosely mounted upon the shaft 31 to rotate freely with respect thereto. The ends of the two segments are suitably spaced apart by two insulation segments 36, so that in normal position the contact arm 32 rests on such insulation and the control circuits to the solenoids are broken. In order to return to and also to maintain the plate 35 in this normal position a roller 37 or the like is mounted upon the plate 35 to rotate freely with respect thereto about an axis fixed with respect to the plate and between two followers 38 which are pressed towards each other respectively by two opposed springs 39, which respectively surround two aligned shafts 39′ 39′ rigidly secured to the two followers 38, 38, and arranged to reciprocate respectively in two fixed bearings 40, 40. The circuits controlled by the segments and arm have a common return conductor 42 connecting the solenoids 24 and 25 with the arm 32 through a battery 43 and two separate conductors 44 and 45 connecting the respective segments 33 and 34 with the respective solenoids 24 and 25.

For automatically rotating the plate 35, whereby one or the other circuit is closed, a suitable clutch mechanism is provided for frictionally locking the plate 35 to a gear 46 loosely mounted upon the shaft 31 and rotated with respect thereto according to requirements by means of an electric motion repeater 47, the control of which will be later described. In the form shown this clutch consists of a cylinder 48 secured to the plate 35 and having a piston 49 therein which is normally pressed outwardly by a spring 50. The piston 49 actuates a piston rod 51 which carries a clutch disc 52 which is normally held in frictional contact with the face of the gear 46 whereby movement of the latter is transmitted to the plate and both turn in the required manner about the shaft 31 and relative to the arm 32. Should it be desired to release the clutch, a pipe 53 is provided and adapted to convey pressure fluid to the cylinder 48, with which it communicates on the side of the piston 49 opposite to the spring 48. A valve 54 in the pipe 53 controls the supply of fluid at will.

The electric repeater 47 which actuates the gear 46 is actuated by an electrical transmitter 55 which is actuated by a gear 56 which is rigidly secured to a normally vertical shaft 56 which is arranged to rotate with respect to the vessel or other movable body about an axis fixed with respect to the vessel or other movable body and coincident with the longitudinal axis of the shaft 56, and to be held against rotation in space about that axis by means of a gyroscope 57 or other suitable stabilizing means. The repeater 47 is connected to the transmitter 55 through a four wire cable 58 including a battery 59. In the present construction the speed ratio is greater than unity and such that the gear 46 rotates or turns at an angular rate of rotation greater than the angular rate of rotation of the gyro-gear 56. In the form shown by way of example the gear ratio is 2½ to 1 and consequently a deviation of the moving body five degrees from its true course will result in the gear 46 being turned in the opposite direction through an angle of twelve and one half degrees. This latter angle must be turned by the arm 32 before it returns to normal position upon the insulating block and hence the rudder movement is limited to a definite predetermined movement.

The operation of the form of this invention shown in Figures 1 and 2 and just described is as follows: Assuming that the moving body, which is being steered on a predetermined course, should deviate from that course, for example five degrees to the right. The first result of this action is a relative movement between the moving body and the gear 56 of the gyro-compass, since this latter is fixed in space and consequently moves with respect to the body five degrees to the left or counter-clockwise. This movement is transmitted to the gear 46, which, due to the speed ratio and gearing, is moved twelve and one half degrees to the right or clockwise, thus correspondingly turning the contact plate 35 relative to the arm 32 and bringing the latter into contact with the segment 34. The electric circuit controlled by the contact arm 32 and segment 34 is thus closed, and the solenoid 25 energized, whereupon the core 26 is shifted so that the slide valve 20 opens the pipe 17 to the supply of pressure fluid from pipe 21. This admits pressure to the motor cylinder 16 and causes the piston 15 to move to the left (Fig. 1) thereby throwing the rudder in the direction required to return the body to its prescribed course and correct its deviation.

In addition to moving the rudder, the turning of the post 11 also turns the shaft 31 which carries the contact arm 32, so that as the angle of the rudder is increasing the angle of the arm 32 relative to its normal position upon the insulation is decreasing. In consequence, when the rudder has swung through twelve and one half degrees the contact arm 32 has reached the insulation and the circuit through the solenoid 25 is broken, with the result that the solenoid is de-energized, its core returned by the spring action, and the pressure fluid cut off from the motor. The pipe 17 consequently exhausts by way of port 22 and the rudder is stopped in a position to return to bring the moving body back to its predetermined course. As the body swings to the left or counter-clockwise under the action of the rudder in its new position, the plate 35 will be turned in a counter-clockwise direction with respect to the moving body under the action of the gyro-compass 57 and the arm 32 will make contact with the segment 33, thus energizing the solenoid 24 and causing the rudder 10 to be turned in a counter-clockwise direction until the arm 32 is again on the insulation segment 36, when the movement of the rudder will be stopped.

It is, therefore, evident that the rudder 10 will be displaced from its central position an amount proportional to the deviation of the moving object from the predetermined course, and in a direction to bring the body back to the predetermined course. The proportion, in the preferred form, gives a movement of the rudder two and one half times that of the amount of deviation of the body, but it should be understood that this ratio of movement may be varied as required or necessary.

In Figures 3 and 4, another embodiment of this invention is disclosed, wherein the control shaft 31 is separated from the rudder post 11, though connected thereto by suitable means for proportioning the throw of the rudder relative to the deviation of the moving body from its course. This mechanism comprises an arm 60 clamped to the post 11 for movement therewith, and having its free end pivoted to an adjustable rod 61 which carries a movable pivot 62 adapted to be clamped in any desired fixed position in a slot 63 of a lever 64. This latter operates the shaft 31 whereby the contact arm 32 is returned to normal position, which operation fixes the limit of angular deviation of the rudder as will be understood. The interposition of the connecting means between the post 11 and shaft 31 makes it unnecessary to employ a repeater between the gyro-compass 57 and the plate 35, and consequently these devices are directly coupled through the medium of a releasable clutch 66 comprising a cylinder 67 having a piston 68 arranged therein for reciprocatory movement and normally pressed in one direction by a spring 69. A piston rod 70 has one end secured to the piston 68 and its opposite end is secured to a clutch disc 71, which is encircled by and arranged to cooperate with a hollow clutch member 72 rigidly secured to the gyroscope stem 73. A pipe 74 passes into the fixed bracket support 75 and communicates with a groove 76 in the support, which groove 76 communicates through a port 77 with the interior of the cylinder 67 so that when the valve 78 in pipe 74 is open, pressure fluid is admitted to the opposite side of piston 68 from the spring 69, whereby the latter is overcome and the clutch in consequence is disconnected.

The operation of this form of the invention is in all material respects similar to that described in connection with the construction of Figures 1 and 2, assuming as before that the moving body should deviate from the predetermined course—say 5 degrees to the right. The first result of this rotation is a relative movement between the moving body and the gyro-compass 57, since this latter is fixed in space and consequently moves with respect to the moving body five degrees to the left, or counter-clockwise. This causes the plate 35 to move in a similar manner with respect to the moving body, and therefore causes the contact segment 34 to move under the brush 32, which energizes the solenoid 25, which moves the rudder 10 in a clockwise direction, as previously described, to return the moving body to the predetermined course. It therefore follows that the rudder 10 will be moving through an angle which is proportional to the angle through which the moving body has turned, and in a direction which will tend to return the moving body to its predetermined course.

In case it is desired to operate the rudder operating means by a control separate from the automatic means shown in Fig. 1, the valve 54 is opened to admit pressure fluid to the cylinder 48 to overcome the spring pressure and move the piston 48 in a direction to release the friction disc 52 from engagement with the gear 46. This renders this portion of the mechanism inoperative and control of the rudder shifting piston 15 is had by way of the pressure fluid pipes 80 and 81 after the valves 82 and 83 have been opened and the valve 85 closed. Any suitable control may be employed with the pipes 80 and 81 to control the movement of the body at will. When, however, the automatic helm limiting means is in use the valves 82, 83 and 54 are closed and the valve 85 opened as will be understood.

In case it is desired to operate the rudder operating means by a control separate from the automatic means shown in Fig. 4, the valve 78 is opened to admit pressure fluid to the cylinder 67 to overcome the spring pressure and move the piston 68 in a direction to release the friction disc 71 from engagement with the hollow clutch member 72. This renders this portion of the mechanism inoperative and control of the rudder shifting piston 15 is had by way of the pressure fluid pipes 80 and 81 after the valves 82 and 83 have been opened and the valve 85 closed. Any suitable control may be employed with the pipes 80 and 81 to control the movement of the body at will. When, however, the automatic helm limiting means is in use the valves 82, 83 and 78 are closed and the valve 85 opened as will be understood.

Having thus described this invention, I claim and desire to protect by Letters Patent:

1. The combination with a dirigible body of a rudder operatively mounted thereon, and actuating means for said rudder including a rotatable segmental contact, an electrical contact arranged to cooperate with said segmental contact, an electrical device controlled by the cooperation of said contacts, and means automatically operative as a result of a deviation of said body from a predetermined normal course to rotate said segmental contact at an angular rate different from the angular rate of deviation of said body from said normal course, to return said body to said normal course.

2. The combination with a dirigible body of a rudder operatively mounted thereon, and actuating means for said rudder including the rotatable segmental contact, an electrical contact arranged to cooperate with said segmental contact, an electrical device controlled by the operation of said contacts and stabilizing means automatically operative as a result of a deviation of said body from the predetermined normal course to rotate said segmental contact at an angular rate different from the angular rate of deviation of said body from said normal course, to return said body to said normal course.

3. The combination with a dirigible body of a rudder and actuating means for said rudder including a rotatable segmental contact, an electrical contact arranged to cooperate with said segmental contact, an electrical gyroscopic stablizing means automatically operative as a result of a deviation of said body from a predetermined normal course to rotate said segmental contact at an angular rate different from the angular rate of deviation of said body from said normal course, to return said body to said normal course.

4. The combination with a dirigible body of a rudder operatively mounted thereon, and actuating means for said rudder including a rotatable segmental contact, an electrical contact arranged to cooperate with said segmental contact, an electrical device controlled by the cooperation of said contacts, and gyroscopic stabilizing means automatically operative as a result of a deviation of said body from the predetermined normal course, to rotate said segmental contact at an angular rate greater than the angular rate of deviation of said body from said normal course to return said body to said normal course.

5. The combination with a dirigible body of a rudder operatively mounted thereon, and actuating means for said rudder including a rotatable segmental contact, an electrical contact arranged to cooperate with said segmental contact, an electrical device controlled by the cooperation of said contacts, and gyroscopic stabilizing means automatically operative as a result of a deviation of said body from the predetermined normal course, to rotate said segmental contact at an angular rate greater than the angular rate of deviation of said body from said normal course, to return said body to said normal course.

6. The combination with a dirigible body, of a rudder operatively mounted thereon, and actuating means for controlling said rudder, including a pair of spaced electrical contacts arranged to rotate in unison with respect to said body about a fixed axis, a contact arm cooperating with said contacts and arranged to move synchronously with said rudder, means automatically operating as a result of an angular deviation of said body from a predetermined normal course to rotate said electrical contacts in unison about said axis at an angular rate different from the angular rate of deviation of said body from said course and means including a plurality of electrical devices controlled by said electrical contacts and said contact arm for operating said rudder so as to return said movable body to its normal course upon being deviated therefrom.

7. The combination with a dirigible body, of a rudder operatively mounted thereon, and actuating means for controlling said rudder, including a pair of spaced electrical contacts arranged to rotate in unison with respect to said body about a fixed axis, a contact arm cooperating with said contacts and arranged to move synchronously with said rudder, gyroscopic stabilizing means automatically operating as a result of an angular deviation of said body from a predetermined normal course to rotate said electrical contacts in unison about said axis at an angular rate different from the angular rate of deviation of said body from said course and means including a plurality of electrical devices controlled by said electrical contacts and said contact arm for operating said rudder so as to return said movable body to its normal course upon being deviated therefrom.

8. The combination with a dirigible body, of a rudder operatively mounted thereon, including a pair of spaced electrical contacts arranged to rotate in unison with respect to said body about a fixed axis, a contact arm cooperating with said contacts and arranged to move synchronously with said rudder, means automatically operating as a result of an angular deviation of said body from a predetermined normal course to rotate said electrical contacts in unison about said axis at an angular rate greater than the angular rate of deviation of said body from said course and means including a plurality of electrical devices controlled by said electrical contacts and said contact arm for operating said rudder so as to return said movable body to its normal course upon being deviated therefrom.

9. The combination with a dirigible body, of a rudder operatively mounted thereon, and actuating means for controlling said rudder, including a pair of spaced electrical contacts arranged to rotate in unison with respect to said body about a fixed axis, a contact arm cooperating with said contacts and arranged to move sychronously with said rudder, gyroscopic stabilizing means automatically operating as a result of an angular deviation of said body from a predetermined normal course to rotate said electrical contacts in unison about said axis at an angular rate greater than the angular rate of deviation of said body from said course and means including a plurality of electrical devices controlled by said electrical contacts and said contact arm for operating said rudder so as to return said movable body to its said normal course upon being deviated therefrom.

10. The combination with a dirigible body, of a rudder, actuating means for said rudder including a pair of spaced contacts arranged to rotate in unison with respect to said body, an electrical contact arranged to cooperate with said spaced contacts and operating in synchronism with said rudder, electrical means controlled by said contacts for moving said rudder, gyroscopic stabilizing means, and means including a clutch operatively connecting said stabilizing means and said spaced contacts, said gyroscopic stabilizing means being operative through said clutch as a result of a deviation of said body from a predetermined normal course to rotate said spaced contacts at an angular rate different from the rate of deviation of said body from said normal course to return said body to said normal course after having been deviated therefrom, and said clutch being operative to disconnect said stabilizing means from said spaced contacts to permit said rudder to be controlled selectively independently of said gyroscopic means.

11. The combination with a dirigible body, of a rudder, actuating means for said rudder including a pair of spaced contacts arranged to rotate in unison with respect to said body, an electrical contact arranged to cooperate with said spaced contacts and operating in sychronism with said rudder, electrical means controlled by said contacts for moving said rudder, gyroscopic stabilizing means, and means including a pneumatic clutch operatively connecting said stabilizing means and said spaced contacts, said gyroscopic stabilizing means being operative through said clutch as a result of a deviation of said body from a predetermined normal course to rotate said spaced contacts at an angular rate different from the rate of deviation of said body from said normal course to return said body to said normal course after having been deviated therefrom, and said clutch being operative to disconnect said stabilizing means from said spaced contacts to permit said rudder to be controlled selectively independently of said gyroscopic means.

12. The combination with a dirigible, of a rudder carried by said body and rotatable with respect thereto to cause a rotation of said body about a normally substantially vertical axis, and energy distributing means carried by said body to rotate said rudder with respect to said body, comprising automatic stabilizing means, an electrical contact rotatable with respect to said body and controlled in rotation by said stabilizing means, and an electrical contact arranged to engage said first mentioned contact and operatively connected to and rotating with respect to said body in synchronism with said rudder, the arrangement being such that whenever said body is rotated about said normally substantially vertical axis through a variable angle, one of said contacts will be automatically rotated through an angle different in extent from the angle of rotation of said body, but having a substantially constant ratio thereto to cause said rudder to be rotated with respect to said body through an angle differing accordingly in extent from the angle of rotation of said body about said normally upright axis.

This specification signed this 11th day of March, 1918.

ALBERT D. TRENOR.